(12) United States Patent
Peters et al.

(10) Patent No.: US 7,797,493 B2
(45) Date of Patent: Sep. 14, 2010

(54) ENHANCING PERFORMANCE OF A MEMORY UNIT OF A DATA PROCESSING DEVICE BY SEPARATING READING AND FETCHING FUNCTIONALITIES

(75) Inventors: Harm Johannes Antonius Maria Peters, Eindhoven (NL); Ramanathan Sethuraman, Eindhoven (NL); Gerard Veldman, Eindhoven (NL); Patrick Peter Elizabeth Meuwissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 413 days.

(21) Appl. No.: 11/815,981

(22) PCT Filed: Feb. 13, 2006

(86) PCT No.: PCT/IB2006/050461
§ 371 (c)(1),
(2), (4) Date: Aug. 10, 2007

(87) PCT Pub. No.: WO2006/087665
PCT Pub. Date: Aug. 24, 2006

(65) Prior Publication Data
US 2008/0147980 A1    Jun. 19, 2008

(30) Foreign Application Priority Data
Feb. 15, 2005    (EP) .................................. 05101101

(51) Int. Cl.
*G06F 13/28*    (2006.01)
(52) U.S. Cl. ....................................... 711/137
(58) Field of Classification Search ........................ None
See application file for complete search history.

(56) References Cited

U.S. PATENT DOCUMENTS

| 5,912,676 A | 6/1999 | Malladi et al. |
| 6,091,768 A | 7/2000 | Bru |

(Continued)

FOREIGN PATENT DOCUMENTS

| EP | 0457403 A2 | 11/1991 |

(Continued)

*Primary Examiner*—Tuan V Thai
*Assistant Examiner*—Duc T Doan

(57) ABSTRACT

The present invention relates to a data processing device (10) comprising a processing unit (12) and a memory unit (14), and to a method for controlling operation of a memory unit (14) of a data processing device. The memory unit (14) comprises a main memory (16), a low-level cache memory (20.2), which is directly connected to the processing unit (12) and adapted to hold all pixels of a currently active sliding search area for reading access by the processing unit (12), a high-level cache memory (18), which is connected between the low-level cache memory and the frame memory, and a first pre-fetch buffer (20.1), which is connected between the high-level cache memory and the low-level cache memory and which is adapted to hold one search-area column or one search-area line of pixel blocks, depending on the scan direction and scan order followed by the processing unit. Reading and fetching functionalities are decoupled in the memory unit (14). The fetching functionality is concentrated on the higher cache level, while the reading functionality is concentrated on the lower cache level. This way concurrent reading and fetching can be achieved, thus enhancing the performance of a data processing device.

26 Claims, 4 Drawing Sheets

U.S. PATENT DOCUMENTS

| | | |
|---|---|---|
| 6,130,680 A | 10/2000 | Cox et al. |
| 6,259,459 B1 * | 7/2001 | Middleton .................. 345/536 |
| 6,437,789 B1 | 8/2002 | Tidwell et al. |
| 6,449,692 B1 | 9/2002 | Krueger et al. |
| 2003/0196045 A1 | 10/2003 | Matsubara et al. |
| 2004/0044847 A1 | 3/2004 | Ray et al. |
| 2005/0262276 A1 * | 11/2005 | Singh et al. .................. 710/22 |
| 2006/0159170 A1 * | 7/2006 | Chiang .................. 375/240.12 |
| 2008/0147980 A1 | 6/2008 | Peters et al. |

FOREIGN PATENT DOCUMENTS

| | | |
|---|---|---|
| EP | 0926600 A1 | 6/1999 |
| WO | 9926132 A2 | 5/1999 |

* cited by examiner

ENHANCING PERFORMANCE OF A MEMORY UNIT OF A DATA PROCESSING DEVICE BY SEPARATING READING AND FETCHING FUNCTIONALITIES

The present invention relates to a data processing device comprising a processing unit and a memory unit, especially for video-data processing applications. It also relates to a method for controlling the operation of a memory unit of such a data processing device.

European Patent Application EP04101677.5 is in its entirety incorporated by reference into the present application.

Video data processing devices are required to deliver a high processing speed on one hand, while on the other hand they should be flexible. Flexibility of a video-data processing device is reflected by its capability of handling various video-processing algorithms like scaling, filtering, motion detection etc., and its ability to process various video image formats.

The memory unit of a video processing system generally comprises a frame memory. The frame memory holds the information needed to display one or several video images of a video sequence, also called frames.

Many video applications like motion estimation benefit from buffering a segment of a currently processed video image in a cache memory. As is well known, a cache memory offers a reduced latency and requires less power for operation due to its smaller size of as compared to the frame memory and its direct connection to the processing unit. The latency determines the time span needed to retrieve the first image data after a read request from the processing unit.

In known video-data processing devices the memory unit has a hierarchical memory architecture comprising a multi-level cache memory. A cache memory, hereinafter also referred to in short as a cache, on the lowest caching level is closest to the processing unit, while the cache memory on the highest caching level is closest to the frame memory.

By providing different caching levels between the processing unit and the frame memory, a balance between cost and performance of the memory unit shall be achieved. Cost factors are the chip area and power requirements of the overall video-data processing device.

The replacement strategy for data in the cache is either dynamic or static, depending on the type of video processing algorithm and the desired predictability of the system. In a memory unit with a dynamic replacement strategy either a cache-hit or cache-miss situation will occur. In a cache-miss situation desired data is not found in the accessed cache and needs to be copied from a higher cache level or from the frame memory. The time penalty associated with this depends on the latency and the bandwidth of the memory. The bandwidth of a memory determines how many bits can be provided by the memory in one clock cycle.

In contrast, a cache miss situation is unlikely to occur when using a static replacement strategy such as the well-known First-In-First-Out replacement strategy. Static replacement strategies are well suited for processing algorithms with predictable memory access patterns.

U.S. Pat. No. 6,449,692 B1 describes a video data processing device with a memory unit, which has a three-level-cache structure. The caching levels are denoted L1 to L3. The numerical designation of the cache levels corresponds to an ascending order, in which a processing unit accesses the caches when it is either reading data from the caches or writing data to the caches. This means that a reading access to the memory unit is first addressed to a L1 cache and, if a cache miss occurs to that cache, it is followed by an access to a L2 cache, and so on, until a hit is made in either a cache or, finally, in a main memory.

The caching levels L1 and L2 of the memory unit in the device of U.S. Pat. No. 6,449,692 only store non-pixel information. Non-pixel information comprises instructions or address translation information, which is made accessible to the processing unit. In contrast, the L3 cache memory stores pixel data as well as non-pixel information. A cache control circuitry is provided, which dynamically apportions sections of the caching level L3 to either non-pixel information or pixel data. An address and arbitration circuit controls the access of the processing unit to the different cache levels. A bus interface unit provides access to a main memory for the L3 cache level and the processing unit directly. When the processing unit issues a read request for pixel data and a cache hit occurs, the L3 cache provides the requested data to the processing unit via a register bypassing the L1 and L2 cache levels. If a cache miss occurs, the processing unit addresses the main memory directly.

In the video data processing device of U.S. Pat. No. 6,449,692 B1 all cache levels provide reading as well as fetching functionality, each cache level for its respective supported types of data. The overall processing speed of the video data processing device is limited by the fact that the cache memory units cannot perform an output to the processing unit (reading functionality) and storing data from the main memory or a higher-level cache (fetching functionality) concurrently, that is, at the same time.

It is therefore an object of the present invention to provide a video-data processing device with a memory unit and a method for controlling operation of a memory unit of a data processing device, which allows performing reading and fetching operations as concurrent tasks.

According to a first aspect of the invention, a data processing device for processing a two-dimensional main array of data elements, comprises a main memory unit having a main memory for storing the main array, a processing unit, which is adapted to sequentially process data blocks forming two-dimensional sub-arrays of the main array, and to provide read requests for data elements of a sliding search area that extends over a preset number of data-block columns and data-block lines of the main array, a high-level cache unit, which has a high-level cache memory connected to the main memory, and which is adapted to fetch from the main memory data blocks for forming a sliding region of the image larger than the sliding search area, pre-fetch data-elements of the stored sliding region, which are needed to update the sliding search area, from the high-level cache memory to a first pre-fetch buffer, and provide these data-elements at the output of the first pre-fetch buffer, a low-level cache unit, which has a low-level cache memory connected directly between the processing unit and the first pre-fetch buffer, and which is adapted to store and update the sliding search area in the low-level cache memory concurrently with the above fetching and pre-fetching operations of the high-level cache unit, using the data-elements provided at the output of the first pre-fetch buffer, and select and output requested data-elements to the processing unit concurrently with the above fetching and pre-fetching operations of the high-level cache unit.

While the preferred use of the data processing device of the invention is in the context of video processing, it is not restricted to such applications. The data processing device of the invention can be used in the context of processing any two-dimensional data array, e.g. an array of seismological data. A two-dimensional data array is a set of data structures that is ordered in a manner corresponding to a two-dimensional matrix. In the particular context of image processing the two dimensional data array, also denoted as main array is an image.

Other general terms should be translated as follows in this context.

"data element" as "pixel"
"data block" as "pixel block"
"data lines" as "pixel lines"
"data columns" as "pixel columns"
"data block column" as "pixel block column"
"data block line" as "pixel block line"

In the following, the data processing device of the invention will be described in the context of the preferred use in the processing of video images. In video processing applications, the image can for instance be a video frame or a video field. A video frame typically comprises all pixels of an image. A video field typically comprises a set of interlaced pixel lines. Interlacing is a concept commonly known in the art and related to providing temporally consecutive video images with complementary subsets pixel lines.

The image is stored in a main memory of the data processing device. A processing unit of the data processing device is adapted to sequentially process pixel blocks forming two-dimensional sub-arrays of the image. The pixel blocks are thus processed one at a time. A pixel block may for instance consist of 8×8, 16×16 or 32×32 pixels. The processing unit may be adapted to use different pixel-block sizes in different video processing contexts.

The processing unit is further adapted to provide read requests for pixels of a sliding search area that extends over a preset number of pixel-block columns and pixel-block lines of the image. The concept of a sliding search area is well known in the art and used in video processing algorithms employing search strategies, such as various known motion estimation algorithms. The search area is a two-dimensional array of pixel blocks forming a sub-array of the image. A sliding movement search area is realized by deleting pixel-blocks at one edge of the search area and adding pixel-block at an opposed edge of the search area. Which pixel-blocks are deleted and which are added, depends on a predetermined direction of the sliding movement of the search area across the image. The movement of the search area can for instance be horizontally from left to right. The movement of the search area is coupled to the scan direction and scan order of the processing algorithm employed by the processing unit for processing pixel blocks. Examples of different scan directions and scan orders will be set forth below in the context of the description of FIG. 4. The size of the search area, i.e., the numbers pixel blocks of covered by the search area in the two dimensions, depends on the type of algorithm used by the processing unit. For instance, the size of the search area depends on the length of a motion vector in a motion estimation algorithm. It may also depend on the frame size in video applications.

The data processing device of the invention comprises a high-level cache unit with a high-level cache memory and a low-level cache unit with a low-level cache memory. The low-level cache memory will hereinafter also be referred to as a L0 cache, a search-area buffer, or as a SA buffer. It is noted that in the preferred application field of the present invention there is typically no register between the processing unit and the high-level cache memory. In other fields of application, the designation L0 cache refers to a register. However, in the present context the designation of the low-level cache memory as a L0 cache shall not imply that this cache memory is a register.

In addition to the respective memories, the high-and low cache units typically comprise related control units, which will herein be referred to as cache controllers. The cache controllers may be implemented in either hardware or software. Correspondingly, the low-level-cache controller will also be referred to as L0-cache controller. The high-level cache will hereinafter also be referred to as a L1 cache or a stripe buffer. Correspondingly, the high-level-cache controller will also be referred to as L1-cache controller.

The data processing device of the invention is based on the general concept that concurrent reading and fetching can be achieved if fetching is concentrated on one cache level and reading is concentrated on another cache level.

In particular the invention is based on an analysis of the parameters, which are recognized during read and fetch operations. Since these parameters vary in different video format standards and different video processing algorithms, it is important to provide for flexibility. The video processing device of the invention is capable of handling various algorithms like scaling, filtering, motion detection, etc., and various video formats, like the common intermediate format (CIF), standard definition television (SDTV), or high definition television (HDTV).

The video processing device of the invention is based on the recognition of the following parameters, which affect the operation of a memory unit in regard to reading and fetching:

1. Block Size The frame memory of the memory unit could be organized in different block sizes, e.g., 8×8 or 16×16 pixels. The block organization controls the replacement strategy of the low-level cache, i. e., how many and which pixels need to be loaded into the low-level cache as processing continues.

2. Scan Direction and Scan Order

In processing consecutive pixel blocks, the processing unit could follow different directions and orders in different video processing algorithms, and therefore access the pixels of a video frame stored in the memory unit in various possible orders. The scan direction could be either from top to bottom, from bottom to top, from left to right, or from right to left. The scan order could be either pixel-block line by pixel-block line, or pixel-block column by pixel-block column or in a meandering style.

3. Video Format

The frame memory could be organized in different colour spaces or video formats. The video format could be either RGB, requiring 8 bits per colour or 24 bits per pixel, or various sub-sampled YUV formats, which are known video formats based on luminance and colour difference.

4. Sub-pixel Accuracy

As is well known, the data for generating smooth borders between objects in a frame requires a finer accuracy than the pixel grid. Based on a coordinate of a required block, the memory unit has to detect and deliver the appropriate block together with additional pixels, which allow performing an interpolation such as bi-linear interpolation for generating the required sub-pixel accuracy.

5. Window Size

The window size is a parameter used by the processing unit to determine the size of a region being read from the memory unit.

6. Window Coordinate

The window coordinate is provided by the processing unit in form of an (X, Y)-coordinate pair, for instance defining the top-left corner of a currently desired read window.

The data processing device of the invention is based on the perception that the parameters 1 to 3, i. e., block size, scan direction and scan order, and video format are related to fetching operations. In a preferred embodiment of the data processing device of the invention, these parameters 1 to 3 are handled on the higher cache level. Therefore, the fetching functionality is concentrated in the high-level cache and the high-level cache controller.

It is noted, however, that a processing device adapted to process only one fixed video format is also within the scope of the invention. A processing device allowing for flexibility of the video format (parameter 3) will be described further below as a preferred embodiment of the data processing device of the invention.

It is a further perception underlying the data processing device of the invention that, in contrast, the parameters 4 to 6, i. e., sub-pixel accuracy, window size and window coordinates are related to reading operations. In the data processing device of the invention, these parameters 4 to 6 are not handled on the higher cache level, but on the lower cache level. Therefore, the reading functionality is concentrated in the low-level cache and the low-level cache controller.

The partitioning of the parameter handling across the low-level and high-level cache units according the invention is summarized in the following table:

TABLE I

Assignment of reading and fetching parameters to cache levels in a preferred embodiment

| Parameter | Low-level cache | High-level cache |
|---|---|---|
| 1 Block size | | X |
| 2 Scan direction and scan order | | X |
| 3 Video format | | X |
| 4 Sub-pixel accuracy | X | |
| 5 Window size | X | |
| 6 Window coordinates | X | |

Again, the video-format parameter is contained for completeness of the table. In one embodiment of the invention the high-level cache unit is adapted to use one common standard video format for storing pixel data, such as the CIF, SDTV or HDTV standard.

To achieve the partitioning of the mentioned parameters, the high-level-cache unit of the data processing device of the invention organizes the high-level cache not according to a partition of the pixels into pixel blocks, but into a partition of pixel lines. More precisely, the high-level cache unit is adapted to fetch from the main memory pixel blocks forming a sliding region of the image larger than the sliding search area and store the sliding region according to a partition into pixel lines or pixel columns in the high-level cache memory. The sliding region generally performs the same movement as the sliding search area. Preferably, the high-level cache unit is adapted to use a partitioning of the fetched pixels into pixel lines. As an alternative, the high-level cache unit is adapted to use a partitioning of the fetched pixels into pixel columns. This alternative embodiment is for instance be applied in vertical peaking.

Furthermore, for updating the sliding search area, the high-level cache unit is adapted to fetch from the main memory pixel blocks needed for updating the sliding region according to a predetermined scan order and scan direction, and store the pixel blocks according to the partition into pixel lines or pixel columns in the high-level cache memory. Therefore, by introducing the pixel-line partitioning on the higher cache level, there is no notion of block size (parameter 1) toward the low-level cache unit.

Furthermore, the provision of the first pre-fetch buffer ensures that the scan direction and scan order (parameter 2) is not relevant from the point of view of the low-level cache unit. The low-level cache unit simply has to copy the data provided in the pre-fetch buffer. By copying these data into the low-level cache memory, the search area, which is provided by the low-level cache, is updated. The high-level-cache unit controls this process by pre-fetching pixels of the stored sliding region, which are needed to update the sliding search area, from the high-level cache memory to the first pre-fetch buffer, and provides the pixels at the output of the first pre-fetch buffer. Implementation of this pre-fetching involves knowledge of the particular video-processing algorithm in order to predict, which pixels will be requested by the processing unit. The high-level cache unit thus accordingly selects appropriate pixel lines stored in the high-level cache memory, and copies the selected pixel lines to the first pre-fetch buffer. Therefore, the low-level-cache controller need not deal with the fetch related parameters of scan direction and scan order. Preferably, copying involves overwriting pixels in the low-level cache memory, which drop out of the search area with the sliding movement step.

The low-level cache unit of the data processing device of the invention is adapted to store and update the sliding search area in the low-level cache memory concurrently with the above fetching and pre-fetching operations of the high-level cache unit, using the pixels provided at the output of the first pre-fetch buffer, and to select from the low-level cache memory and output requested pixels to the processing unit concurrently with the above fetching and pre-fetching operations of the high-level cache unit. In preferred embodiments described further below, the selection of the pixels requested by the processing unit implies a recognition of the parameters 4 to 6, i.e., sub-pixel accuracy, window coordinate, and window size, if used by a particular processing algorithm implemented in the processing unit.

Thus, according to the invention, all parameters related to fetching from the main memory are handled by the high-level-cache controller, while the low-level-cache controller can be restricted to a functionality of responding to read requests from the processing unit and providing pixel data to the processing unit. In the data processing device of the invention, there is no need for fetch requests directed from the lower cache level to the higher cache level or to the main memory.

Due to the achieved decoupling of fetching and reading functionalities in the data processing device of the invention, the high-level cache unit and the low-level cache unit are enabled to perform fetching and reading operations in parallel, which is also referred to as concurrent communication and computation. This decreases the latency of the memory unit of the data processing device as a whole, i.e., comprising main memory and all cache levels. Furthermore, the decoupling the fetching and reading steps reduces undesired duplication of functionality in every cache level. This allows optimizing each cache level in terms of performance and required chip area for its own core function. Furthermore, maintainability and possible functionality extensions can be handled with better efficiency.

In the following, preferred embodiments of the data processing device of the invention will be described.

The impact of a chosen video format (parameter 3) on the low-level cache is removed in a preferred embodiment of the data processing device of the invention by the adaptation of the high-level-cache controller to provide pixels of the sliding region at its output according to a fixed pixel data format having a preset number of bit positions and assigning a predetermined bit value to all bit positions, which are not used by a video format of the image. The pixel format used by the high-level cache unit of this embodiment of data processing device of the invention has a preset number of bit positions. Thus, pixels of all video formats look identical from the point of view of the low-level cache unit. The number of bit positions in the pixel format is chosen large enough to accommodate all known video formats. Bit positions of the pixel format, which are not used by a currently processed video format, are filled by the high-level-cache unit with a predetermined bit value, such as "0". Using the bit value of "0" keeps the connected processing data path simple. By writing "0" to the unused bit positions via the high-level cache memory through the first pre-fetch buffer, video format control is not necessary in the low-level cache. The output of the low-level cache memory has the correct format.

In a further embodiment of the invention the low-level-cache unit is adapted to derive from a read request received from the processing unit two window coordinates and a window-size parameter, and to select and provide pixels stored in the low-level cache memory to the processing unit in dependence on the derived coordinates and parameters (parameters 5and 6).

In a further embodiment, the low-level-cache controller is preferably further adapted to detect from the window coordinates provided with a read request, whether the processing unit processes pixel data with sub-pixel accuracy (parameter 4), and to provide all additional pixels required for sub-pixel-accuracy processing to the processing unit.

Another preferred embodiment of the data processing device of the invention further comprises a second pre-fetch buffer, which is connected between the high-level cache memory and the main memory and adapted to provide pixel data to the high-level cache memory in a parallel fashion. In this embodiment, the high-level cache unit is adapted to pre-fetch from the main memory to the second pre-fetch buffer selected pixel-blocks of the image, which are needed for updating the sliding region according to the predetermined scan order and scan direction, and to update the sliding region in the high-level cache memory with pixels provided at the output of the second pre-fetch buffer.

The second pre-fetch buffer allows further accelerating the fetching operations by loading the second pre-fetch buffer with pixels to be copied next to the high-level cache according. The data are provided in parallel from the second pre-fetch buffer to the high-level cache memory. The operation of the second pre-fetch buffer is controlled by the high-level cache controller and is again based on knowledge of the order, in which the processing units requests the pixels of the image currently processed.

The main memory unit provided in the data processing device of the invention is in a further embodiment adapted to access the main memory in read and write operations according to a partition of the image into pixel blocks arranged in a plurality of pixel-block lines and pixel-block columns.

In a preferred embodiment, the low-level cache memory takes the form of a scratchpad. That is, the low-level cache memory is in this embodiment adapted to hold the complete search area. This way, the complete search area can be stored in the low-level scratchpad before processing starts. Cache misses are avoided completely in this embodiment. Preferably, the low-level cache unit is adapted to replace pixels stored in the low-level scratchpad according to a first-in-first-out replacement scheme as the search area moves to a next position on the image.

While for video applications a scratchpad is preferred, other applications of the data processing device of the invention do not require the presence of the complete search area in the lower cache level. For such applications a cache memory adapted to hold a region of the image smaller than the search area may be used.

In another embodiment, the low-level cache memory comprises a plurality of memory banks. The low-level cache unit is adapted to store pixels belonging to consecutive pixel lines of a pixel block in different memory banks, and to output a plurality of pixel lines of a requested pixel block in parallel to the processing unit. This way, the bandwidth of the communication between the processing unit and the low-level cache can further be increased. Preferably, the low-level cache unit is adapted to address locations in the low-level cache memory in an interleaved manner, assigning consecutive addresses to addressable locations in consecutive memory banks in a circular repeating manner. This way, bank conflicts are avoided when outputting several lines in parallel.

In a preferred implementation of the data processing device of the invention, the low-level cache memory comprises a plurality of line units, each line unit containing a respective first number of memory banks, each memory bank having addressable locations for storing a second number of pixels. The low-level cache unit is adapted to store pixels of respective pixel lines of a pixel block or of pixel lines belonging to respective interleaved sets of pixels lines of a pixel block, into the memory banks of the respective line units, wherein respective addressable locations of the memory banks each are adapted to store a respective group of pixels consisting of the second number of successive pixels along a pixel line, such that successive groups of pixels are distributed in circularly repeating fashion over the memory banks of the line unit that stores pixels of the respective pixel line, to which the groups belong, update the sliding search area by replacing in the memory banks obsolete pixels, which drop out of the sliding search area upon movement of the sliding search area, by new pixels in the search area from a same pixel line as the obsolete pixels, retrieve and output in parallel pixels for respective pixel lines from a plurality of line units.

In a further embodiment of the invention, the predetermined scan direction in each pixel-block line is either from left to right or from right to left or, alternatively, the predetermined scan direction in each pixel-block column is from top to bottom or from bottom to top. In other words, the scan direction is non-meandering. As is well known, a meandering scan direction changes with each line. That is, for example, if a first line is processed from left to right, the next line will be processed from right to left. In this embodiment, the high-level cache unit is adapted to select in the high-level cache memory and provide through the pre-fetch buffer all pixels of a respective sliding search area for a complete replacement in the low-level cache memory for the purpose of processing a pixel block at a beginning of a new pixel-block line or pixel-block column of the image, respectively.

In further embodiment, the high-level cache unit is adapted to fetch from the main memory, select in the high-level cache memory, and provide through the pre-fetch buffer all pixels of a respective sliding search area for a complete replacement in the low-level cache memory for the purpose of processing a pixel block at a beginning of a new image.

The embodiments of the data processing device of the invention described here and in the claims can be combined with each other, unless otherwise stated.

According to a second aspect of the invention a method is provided for controlling operation of a memory unit of a data processing device with a processing unit sequentially processing pixel blocks, which form two-dimensional sub-arrays of an image stored in a main memory of the memory unit, and providing read requests to the memory unit for pixel blocks of a sliding search area extending over a preset number of pixel-block columns and pixel-block lines of the image, the method comprising the steps of fetching from the main memory to a high-level cache memory a sliding region of the image, the sliding region being larger than the sliding search area, and storing the sliding region in the high-level cache memory according to a partition into pixel lines or pixel columns, fetching from the main memory to the high-level cache memory pixel blocks for updating the sliding region according to a predetermined scan order and scan direction, and storing the pixel blocks in the high-level cache memory according to the partition into pixel lines or pixel columns, pre-fetching from the high-level cache memory to a first pre-fetch buffer and providing at the output of the first pre-fetch buffer pixels of the sliding region, which are needed to update the search area in a future sliding-search-area movement, storing and updating the sliding search area in a low-level cache memory concurrently with the above fetching and pre-fetching operations, using the pixels provided at the output of the first pre-fetch buffer, selecting and outputting requested pixels from the low-level cache memory to the processing unit concurrently with the above fetching and pre-fetching operations.

The method of the invention relates to the control of the memory subsystem of the data processing device of the invention. The advantages of the method correspond to those described above for the data processing device.

In the following, preferred embodiments of the method of the invention will be set forth. The embodiments represent method aspects of embodiments of the data processing device enabling concurrent reading and fetching, as described above. Therefore, the following description is kept short and for further reference is made to the above sections for further explanation.

One embodiment of the invention comprises a step of providing pixels of the sliding region to the low-level cache memory according to a fixed pixel data format having a preset number of bit positions and assigning a predetermined bit value to all bit positions, which are not used by a video format of the image.

In a further embodiment, all pixels of the sliding search area are provided in the low-level cache memory, and pixels stored in the low-level cache memory are replaced for updating the sliding search area according to a first-in-first-out replacement scheme.

In a further embodiment, the low-level cache memory comprises a plurality of memory banks. Pixels belonging to consecutive pixel lines of a pixel block are stored in different memory banks, and a plurality of pixel lines of a requested pixel block is output from the low-level cache memory to the processing unit in parallel.

In another embodiment, locations in the low-level cache memory are addressed in an interleaved manner, assigning consecutive addresses to addressable locations in consecutive memory banks in a circular repeating manner.

A further embodiment comprises a step of pre-fetching from the main memory to a second pre-fetch buffer selected pixel-blocks of the image, which are needed for updating the sliding region according to the predetermined scan order and scan direction, and a step of updating the sliding region in the high-level cache memory with pixels provided at the output of the second pre-fetch buffer.

A further embodiment comprises a step of deriving from a read request received from the processing unit window coordinates and a window-size parameter, and a step of providing pixels stored in the low-level cache unit to the processing unit in dependence on the derived window coordinates and window-size parameter.

In another embodiment either the predetermined scan direction in each pixel-block line is from left to right or from right to left or, alternatively, the predetermined scan direction in each pixel-block column is from top to bottom or from bottom to top. The method of this embodiment comprises the steps of selecting in the high-level cache memory and providing through the pre-fetch buffer all pixels of a respective sliding search area for a complete replacement in the low-level cache memory for the purpose of processing a pixel block at a beginning of a new pixel-block line or pixel-block column of the image, respectively.

Another embodiment comprises the steps of fetching from the main memory, selecting in the high-level cache memory, and providing through the pre-fetch buffer all pixels of a respective sliding search area for a complete replacement in the low-level cache memory for the purpose of processing a pixel block at a beginning of a new image.

Further embodiments of the invention will be described in the following with reference to the enclosed figures.

Figure 1:
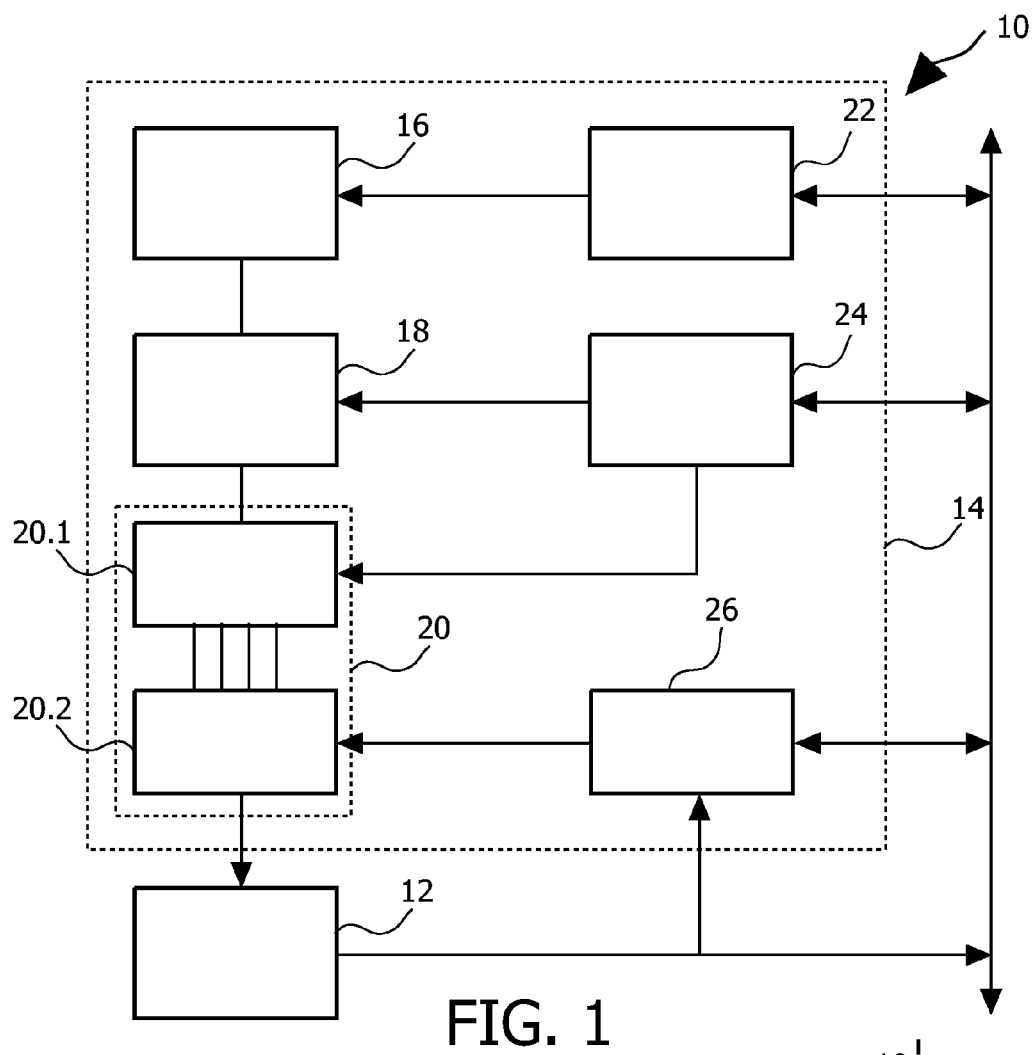
FIG. 1 shows a block diagram of a video processing device forming a first embodiment of the data processing device of the invention.

FIG. 1 shows a block diagram of a video processing device 10 forming a first embodiment of the data processing device of the invention. The video processing device 10 has a processing unit 12 and a memory unit 14, which is connected to the processing unit 12. Video processing system 10 represents an embedded system specialized for performing video processing algorithms like scaling, filtering, motion detection, motion estimation, etc.

Memory unit 14 of video processing device 10 comprises a frame memory 16 and, connected between processing unit 12 and frame memory 16, a high-level scratchpad 18 and a low-level scratchpad 20. High-level scratchpad 18 will hereinafter also be referred to as a L1 scratchpad. A first pre-fetch buffer 20.1 is provided between high-level scratchpad 18 and low-level scratchpad 20.2. Low-level scratchpad 20 will hereinafter also be referred to as L0 scratchpad and as search-area (SA) scratchpad.

All control operations necessary to operate memory unit 14 in connection with processing unit 12 are controlled by one or several memory controllers. In the present embodiment, frame memory controller 22 controls the operation of frame memory 16, high-level-scratchpad controller 24 controls the operation of L1 scratchpad 18 and of pre-fetch buffer 20.1, and low-level-cache controller 26 controls the operation of search-area scratchpad 20.2. High-level scratchpad controller and high-level scratchpad form a high-level cache unit. Low-level cache controller and low-level scratchpad form a low-level cache unit. High-level- and low-level- scratchpad controllers 24 and 26 are also referred to as L1- and L0-scratchpad controllers, respectively. The following sections give a guideline for determining the size and the bandwidth of the L0-scratchpad 20.2, L1 -scratchpad 18, and the pre-fetch buffer 20.1 by way of several examples.

1. L0 Scratchpad

In an embodiment providing no flexibility of the handled video format, the required memory size of the L0 scratchpad is generally dependent on the processed video format. The following table II summarizes the size requirements of the three video formats CIF, SDTV, and HDTV in terms of search area size and memory size. The memory size is specified for two cases, namely, the case of pixels carrying only 8 bits of luminance information, which is referred to as "Y" in the table below, and the case of coloured pixels carrying luminance information for three colours amounting to 24 bits in total, which is referred to as RGB in table II.

TABLE II

Required L0-scratchpad size for different examples of video formats

| Format | Search area size | | Required L0 scratchpad size (kbit) | |
|---|---|---|---|---|
| | Pixel blocks in horizontal direction | Pixel blocks in vertical direction | Y | RGB |
| CIF | 6 | 4 | 12 | 36 |
| SDTV | 9 | 5 | 22.5 | 67.5 |
| HDTV | 17 | 9 | 76.5 | 229.5 |

As a guideline for reading the table above, an example is explained referring to the bottom line of table II: The search area in the HDTV format has 17 8-by-8pixel blocks in horizontal direction and 9 8-by-8 pixel blocks in vertical direction. In the RGB pixel format, where every pixel holds 24 bits, 17×9×8×8×24=235008 bit =229.5 kbit are needed for the SA buffer. When using only luminance information of 8 bit per pixel, 78336 bit or 76.5 kbit is the minimum size of the L0 scratchpad.

In an embodiment providing flexibility of the chosen video format, the SA scratchpad size is the largest required by the supported video formats.

In another embodiment a L0 cache is used rather than a L0 scratchpad. In this embodiment, the L0 cache may have a memory capacity, which is smaller than that required for storing the complete search area. However, an appropriate pre-fetching strategy, which is chosen in dependence on the particular video-processing algorithm performed by processing unit 12, can completely avoid cache miss situations when a read request is directed to the L0 cache.

2. L1 Scratchpad

For the example of the HDTV format the memory size of the L1 scratchpad is determined by the requirement that a total of 2000 pixel blocks containing 8×8 pixels need to be stored. Given a pixel size of 24 bits, the L1 scratchpad should have a memory size of 3 Mbit.

In one embodiment, a L1 cache is used instead of a L1 scratchpad. That means that L1 cache 18 holds less than the sliding region. This embodiment is preferably used in connection with the embodiment of FIG. 2, comprising a second pre-fetch buffer 18.1 in addition to a L1 cache 18.2. By implementing an appropriate cache replacement strategy in high-level cache controller 24', the L1 cache can always hold the pixels, which are needed to update the search area in L0 scratchpad 20.1, or L0 cache 20.1.

3. First Pre-fetch Buffer

The size of the first pre-fetch buffer 20.1 of the L0 scratchpad 20 can be dimensioned according to the following guideline given for the example of the HDTV video format. The height of the search area, or, in other words, the size of one search-area column, is 9 pixel blocks comprising 8×8 pixels each. Therefore, during steady state, one such search-area column of 9 pixel blocks is required to update the search area. Since every pixel comprises a maximum number of 24 bits, the pre-fetch buffer 20.1 should have a size of 9×8×8×24=13824 bits=13.5 kbit.

4. Bandwidth

As to the memory bandwidth, typically the processing data path parallelism equals the size of the pixel line of a pixel block, e.g., 8 pixels in case of 8-by-8 pixel blocks. This holds for the case of block-based processing applications like motion estimation for temporal up-conversion, de-interlacing etc.

The bandwidth can be further increased by providing multiple pixel lines of a pixel block in parallel, by organizing the memory system in such a way, that consecutive pixel lines are in different memory banks. By interleaving bank lines through out the bank sets bank conflicts are avoided when outputting several lines in parallel. An example of a memory structure adapted to output several consecutive pixel lines in parallel is given in the embodiments of claims 19 and of claim 20 of European Patent Application EP04101677.5, and in the memory structure of FIG. 7 of EP04101677.5, described in detail on pages 12 to 23 of EP04101677.5 as filed.

Figure 2:
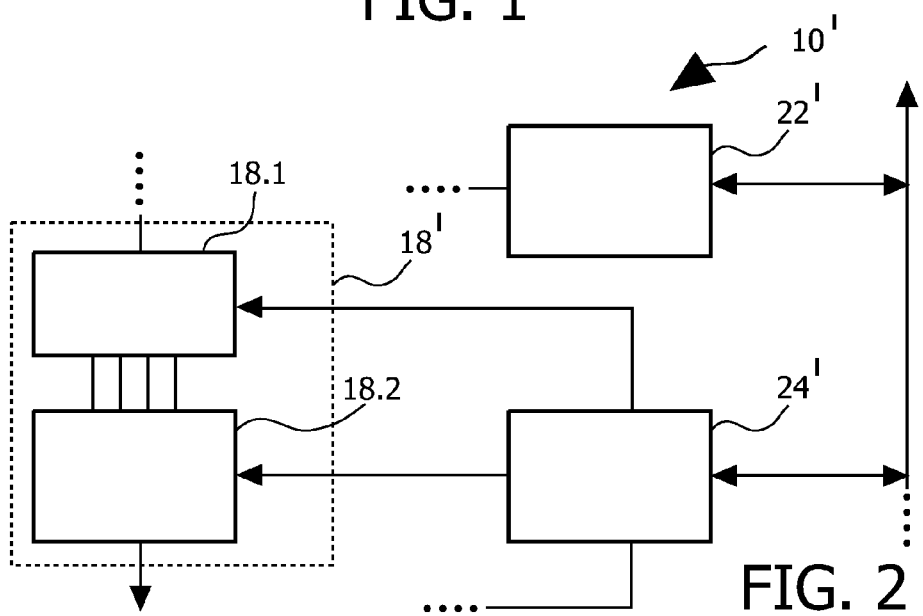
FIG. 2 shows a detail of a video-processing device according to a second embodiment of the invention.

Before turning to the description of the operation of the video processing device of FIG. 1, an alternative embodiment will shortly described with reference to FIG. 2. The block diagram of FIG. 2 shows a detail of a video processing device according to a second embodiment of the invention. The structure of video processing device 10' of FIG. 2 corresponds in most parts to that of video processing device 10 of FIG. 1. The present description is restricted to the differences and will use the reference symbols of FIG. 1 for like parts unless otherwise given. High-level scratchpad 18' of video processing device 10' comprises a second pre-fetch buffer 18.1 connected between the frame memory 16 and L1 scratchpad 18.2. The pre-fetch buffer 18.1 has a parallel output to provide several pixels in parallel to the L1 scratchpad 18.2. Operation of the second pre-fetch buffer is controlled by high-level-cache controller 24'.

Next, operation of the video processing device of FIGS. 1 and 2 with respect to concurrent communication and computation will be described with further reference to FIGS. 3 through 7.

During an initialization phase the L1 scratchpad is loaded with fetch-related parameters via a host system. Based on this information, a sliding region is fetched from frame memory 16 to L1 scratchpad 18. L1 scratchpad controller 24 handles the fetching operation. The sliding search area covers several pixel-block lines and extends at least over the number of pixel-block lines covered by the sliding search area, which is used by the video-processing algorithm to be performed by processing unit 12. The sliding region stored in L1 scratchpad 18 may for instance form a stripe extending over all pixel-block columns of the video frame and over a number of pixel-block lines, which is identical to that contained in the search area. In another example, which is particularly suited for a scan direction of the processing unit from top to bottom, the sliding region horizontally has the same extension as the search area, but in vertical direction extends over more pixel-block lines than the search area, or over the complete vertical extension of the frame. The L1 scratchpad holds the sliding region in pixel-line fashion, whereas frame memory 16 holds the frame according to a partition into pixel blocks. L1 may be organized in a direct-mapped manner.

L0 scratchpad 20.1 is initialized by loading the required data of the respective search area, which is allocated to the first pixel block to be processed, through the pre-fetch buffer 20.1. L1-scratchpad controller 24 controls that the data is provided through pre-fetch buffer 20.1 in a predetermined order.

Figure 3:
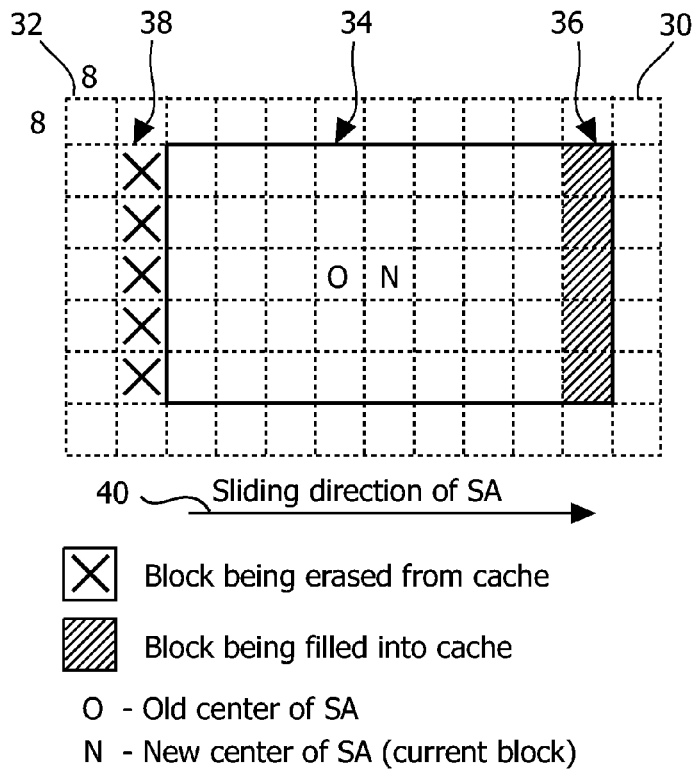
FIG. 3 shows a diagram for illustrating a video processing algorithm based on a search area and for illustrating a cache replacement strategy according to a third embodiment of the invention.

FIG. 3 shows a diagram for illustrating a video-processing algorithm based on a search area, and for illustrating a scratchpad-replacement strategy implemented in an embodiment of the video processing device of the invention.

A pixel-block grid 30 represents a region of 12×7 pixel blocks forming a subset of a complete video frame. Each pixel block consists of 8×8 pixels. This is indicated by the numbers written on two sides of pixel block 32 in the top left corner of pixel-block grid 30. A search area 34 within the pixel-block grid 30 is outlined by a full line. The search area consists of 9×5=45 pixel blocks. A search-area line consists of 9 pixel blocks. A search-area column consists of 5 pixel blocks. A currently processed center pixel block of the search area is indicated by a capital letter N. A previous center pixel block of the search area is indicated by a capital letter O.

Processing a current center pixel block involves scanning a respective search area of 9×45 pixel blocks around the current center block. Thus, when the processing of previous center pixel block 0 is finished, the search area is updated in L0 scratchpad 20.2 according to the known scan order and scan direction through L1 scratchpad 18 and pre-fetch buffer 20.1 before processing unit 12 processes new center pixel block N.

In the example shown in FIG. 3, the search area in the L0 scratchpad 20.2 is updated by loading a new search-area column 36 into the SA buffer 20.2, at the same time erasing the previous left-most search-area column 38 from SA buffer 20.2. The new right-most search-area column 36 is accentuated by hatching in FIG. 3, while blocks being erased from the search area buffer 20.2 are marked by "X". The resulting sliding direction of the search area to the right is indicated by an arrow 40.

As to the first pre-fetch buffer 20.1, the pixels contained in the first pre-fetch buffer 20.1 are the pixels contained in the new search-area column 36. These pixels are provided to the L0 scratchpad 20.2 pixel line by pixel line, with all pixels of a pixel line being provided in parallel. As explained before, in effect there is no notion of the block size on the lower cache level.

FIG. 4 shows several examples of combinations of scan order and scan direction, which may be used by different algorithms for processing a video frame or video field. In general, the scan direction indicates the processing order of consecutive pixel lines or pixel columns. The scan order indicates, whether processing is performed line-by-line or column-by-column. Knowledge of scan order and scan direction employed by a video-processing algorithm is vital for choosing an appropriate cache or scratchpad replacement strategy. The implementation of such replacement strategies involving pre-fetching the required data is well known in the art.

Figure 4A:
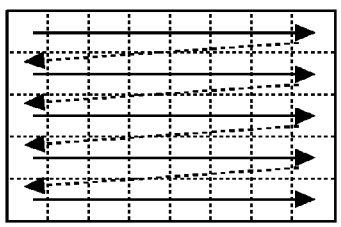
FIG. 4 shows several examples of combinations of scan order and scan direction in various embodiments of the invention.

FIG. 4*a*) shows an embodiment, in which the processing unit 12 processes the pixel blocks within a search area in a scan direction from top to bottom and in a line-by-line scan order. In this embodiment, the processing within each pixel-block line is performed from left to right.

Figure 4B:
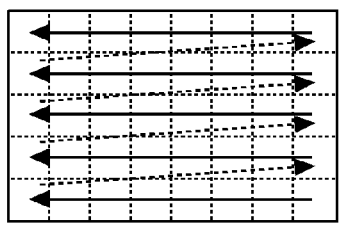

FIG. 4*b*) shows an alternative embodiment, in which the processing unit 12 performs the processing of the pixel blocks contained in a search area following a scan direction from bottom to top and in a line-by-line scan order. In this embodiment, the pixel blocks of each pixel-block line are scanned from right to left.

Figure 4C:
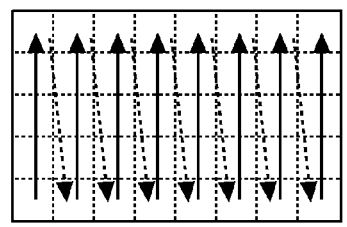

FIG. 4*c*) shows a third alternative embodiment, in which processing is performed in a scan direction from left to right and a column-by-column scan order. In this embodiment, every pixel-block column is scanned from bottom to top.

Figure 4D:
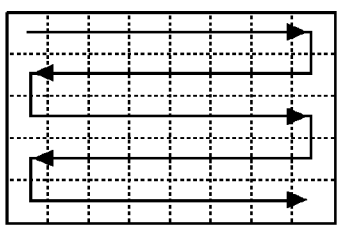

FIG. 4*d*) shows a fourth alternative embodiment, in which processing is performed in a scan direction from top to bottom and in a line-by-line scan order. This embodiment is equivalent to that of FIG. 4*a*), except for the fact that processing within the pixel-block lines is performed in a meandering style. The top pixel-block line is scanned from left to right, while the next pixel-block line below is processed from right to left, and so on.

Figure 4E:
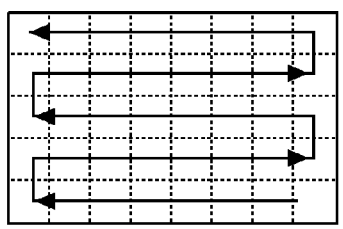

FIG. 4*e*) shows a fifth alternative embodiment, in which the processing unit scans the search area in a scan direction from bottom to top and in a line-by-line scan mode. In contrast to the embodiment of FIG. 4*b*), processing is performed in a meandering style. The bottom pixel-block line is scanned from right to left, while the next upper pixel-block line is scanned from left to right, and so on.

Figure 4F:
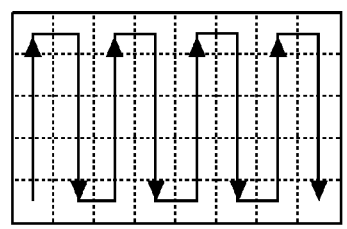

FIG. 4*f*) shows a sixth alternative embodiment, in which the processing unit 12 processes a search area in a scan direction from left to right and in a column-by-column scan order. In contrast to the embodiment of FIG. 4*c*), scanning of the columns is performed in a meandering style. The left-most column is scanned from bottom to top while the next column to the right is scanned from top to bottom, and so on.

In the non-meandering examples of FIGS. 4*a*) to 4*c*), special care has to be taken in designing the replacement strategy with respect to switching to a new line or column. In this case, the complete search area will generally have to be replaced in the L0 scratchpad 20.1 before processing unit 12 continues and processes the first pixel block of the next line or column. The scratchpad replacement in this situation corresponds to the initialization phase described above. Of course, it is not necessary in this situation to reload fetch-related parameters of the current video-processing algorithm before updating the L1 and L0 scratchpads.

Figure 5:
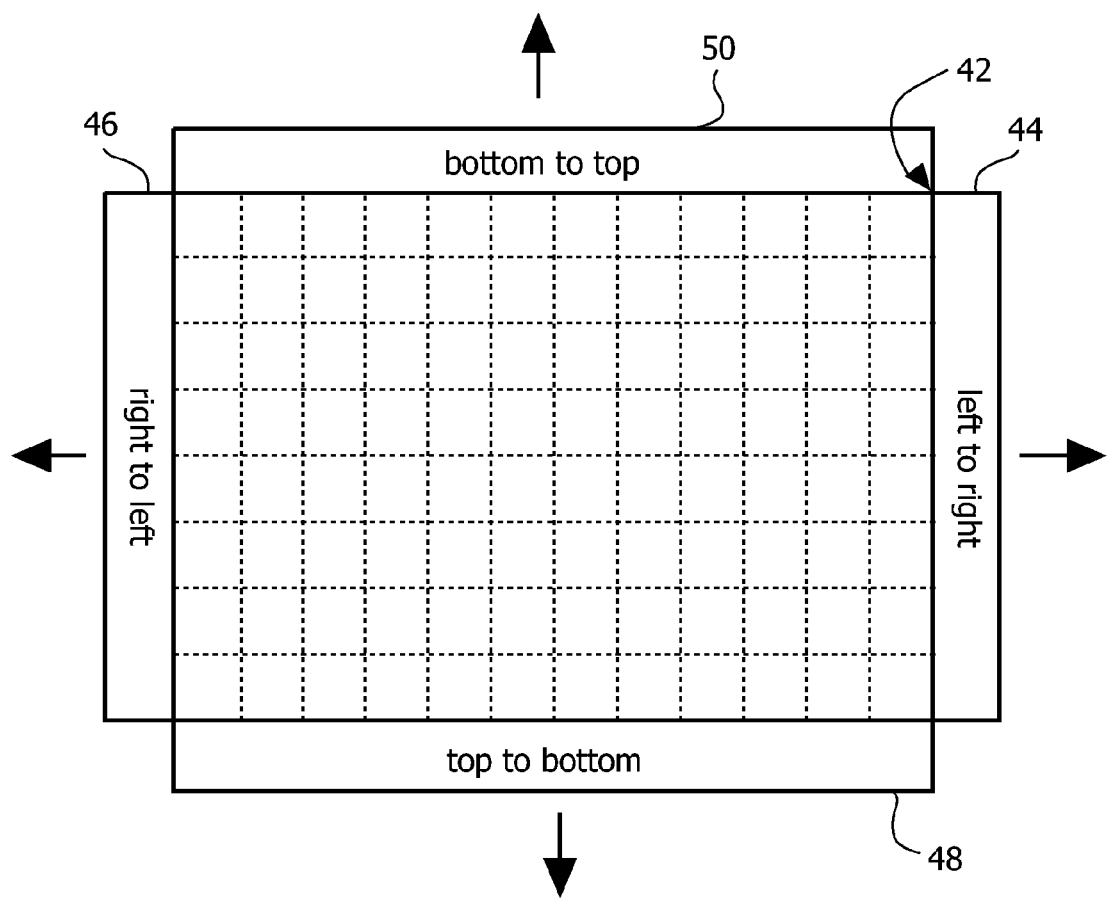
FIG. 5 is an illustration of the influence of the scan direction on the cache replacement strategy in various embodiments of the invention.

FIG. 5 is an illustration of the influence of the scan direction on the replacement strategy in the L0 scratchpad 20.2. FIG. 5 shows a second example of a search area forming an alternative to that of FIG. 3. In the present example, the search area consists of search-area lines of 12 pixel blocks and search-area columns of 8 pixel blocks. As in the example of FIG. 3, a grid of dashed lines indicates the pixel blocks. The illustration of FIG. 5 summarizes four possible embodiments. In a first embodiment shown in FIG. 5, the sliding direction of the scan area is identical to that shown in FIG. 3, namely, from left to right. As a consequence, a search-area column 44 to the right of the currently active search area must be filled into the L0 scratchpad 20.2, and is loaded into the first pre-fetch buffer 20.1 by high-level cache controller 24. An arrow positioned next to search-area column 44 and pointing to the right indicates the sliding direction of the search area for this embodiment.

In a second embodiment shown in FIG. 5, the scan area slides from right to left, and a new left most search-area column 46 must be loaded into the L0 scratchpad 20.2 through pre-fetch buffer 20.1 and L1 scratchpad 18. An arrow positioned next to search-area column 46 and pointing to the left indicates the sliding direction of the search area for this embodiment.

In a third embodiment shown in FIG. 5, the search area slides from top to bottom of the frame. Therefore, a new bottom search-area line 48 must be loaded into the L0 scratchpad 20.2 as the processing continues. An arrow positioned next to search-area line 48 and pointing down indicates the sliding direction of the search area for this embodiment.

Finally, in a fourth embodiment shown in FIG. 5, the search area slides in a direction from bottom to top. Therefore, a new top search-area line 50 must be loaded into the L0 scratchpad. An arrow positioned next to search-area column 50 and pointing up indicates the sliding direction of the search area for this embodiment.

Figure 6:
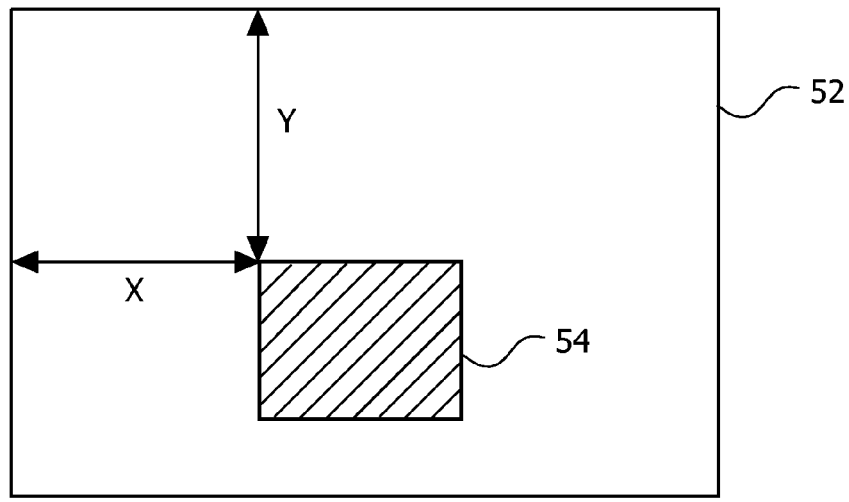
FIG. 6 is an illustration of window coordinates.

FIG. 6 is an illustration an illustration of a window and its definition by window coordinates. In FIG. 6, a search area 52 is shown. A window 54 inside search 52 is defined by a predetermined window size and one X- and one Y-coordinate. The top left corner of the search area forms the origin of the search area for the purpose of defining the position of the top left corner of window 54. The window coordinates X and Y are derived from the read request by L0-scratchpad controller 26. For instance, the coordinates X and Y can be formed by two positive integer values in quarter pixel resolution. This way fixed-point arithmetic can be avoided. The L0-scratchpad controller 26 detects a possible sub-pixel resolution, as will be explained in the following with reference to FIG. 7.

Figure 7:
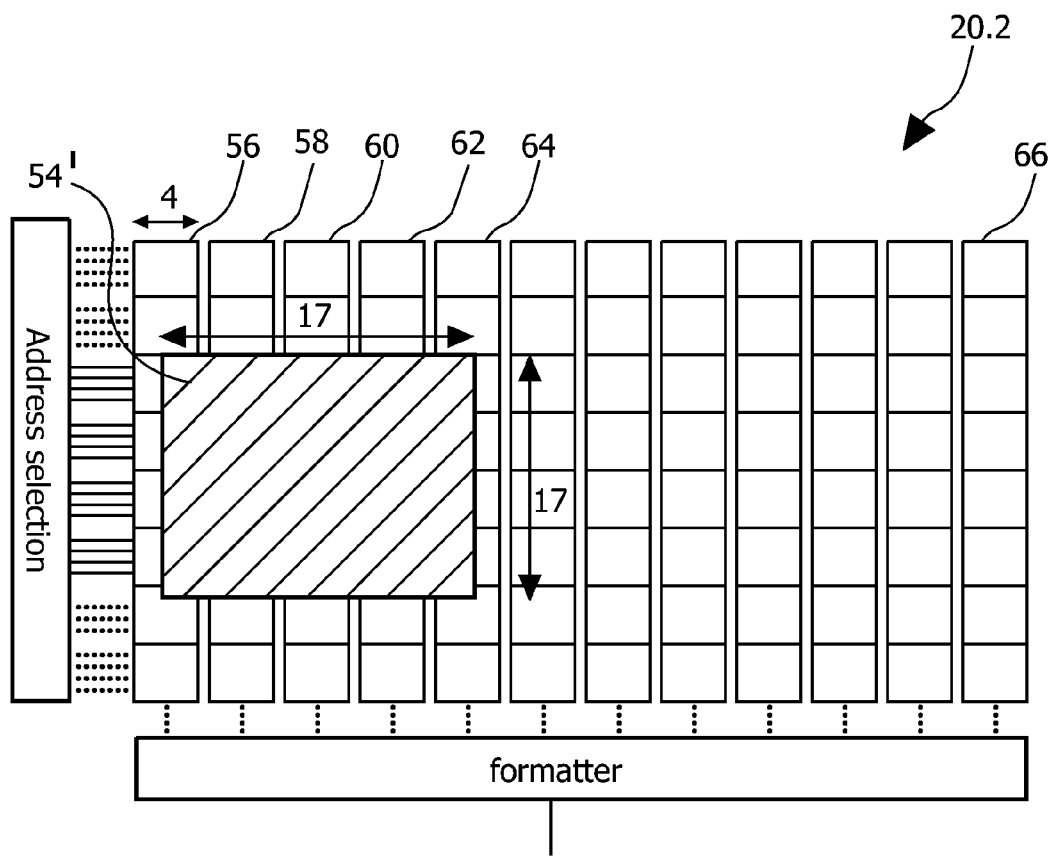
FIG. 7 is an illustration of a window size in a further embodiment of the invention using a direct-mapped cache.

FIG. 7 shows a representation of a section of the L0 scratchpad 20.2 of FIG. 1 with parts of the control circuitry contained in L0-scratchpad controller 26. The L0-scratchpad section shown consists of 12 memory banks, of which memory bank 56 to 66 are marked by individual reference symbols. Each memory bank is 4 pixels wide and 32 pixels deep. A window 54' is shown to extend over parts of memory banks 56 to 64. L0 scratchpad 20.2 is direct-mapped in the present embodiment. Therefore, contributions from a number of banks are needed to make the window complete. The coordinates of the window 54' are assumed to be sub-pixel accurate. Therefore, the window is extended with additional pixels to support the interpolation filtering. Given an example in which the window size is 16 by 16 pixels, the L0-scratchpad controller detects the sub-pixel accuracy and delivers a window of 17 by 17 pixels to the processing unit 12.

The invention claimed is:

1. A data processing device for processing a two-dimensional array of data elements, the data processing device comprising a main memory unit having a main memory for storing the array, a processing unit, which is adapted to sequentially process data blocks forming two-dimensional sub-arrays of the array, and to provide read requests for data elements of a sliding search area that extends over a preset number of data block columns and data block lines of the array, a high-level cache unit, which has a high-level cache-memory connected to the main memory, and which is adapted to fetch from the main memory data blocks for forming a sliding region of an image larger than the sliding search area, pre-fetch data-elements of the stored sliding region, which are needed to update the sliding search area, from the high-level cache memory to a first pre-fetch buffer, and provide these data-elements at the output of the first pre-fetch buffer, a low-level cache unit, which has a low-level cache memory connected directly between the processing unit and the first pre-fetch buffer, and which is adapted to derive a parameter from the read request, store and update the sliding search area in the low-level cache memory concurrently with the above fetching and pre-fetching operations of the high-level cache unit, using the data-elements provided at the output of the first pre-fetch buffer, and select and output requested data-elements, using the parameter, to the processing unit concurrently with the above fetching and pre-fetching operations of the high-level cache unit.

2. The data processing device of claim 1, wherein the high-level cache unit is adapted to provide data-elements of the sliding region at its output according to a fixed data format having a preset number of bit positions and assigning a predetermined bit value to all bit positions, which are not used by a format of the array.

3. The data processing device of claim 1, wherein the first pre-fetch buffer is adapted to provide data to the low-level cache memory in a parallel fashion.

4. The data processing device of claim 1, wherein the first pre-fetch buffer is adapted to store data-elements for replacing one data-block column or one data-block line of the search area.

5. The data processing device of claim 1, wherein the low-level cache unit comprises a low-level scratchpad.

6. The data processing device of claim 5, wherein the low-level cache unit is adapted to replace data elements stored in the low-level scratchpad according to a first-in-first-out replacement scheme.

7. The data processing device of claim 1, wherein the low-level cache memory comprises a plurality of memory banks and wherein the low-level cache unit is adapted to store data-elements belonging to consecutive data lines of a data block in different memory banks, and to output a plurality of data lines of a requested data block to the processing unit in parallel.

8. The data processing device of claim 7, wherein the low-level cache unit is adapted to address locations in the low-level cache memory in an interleaved manner, assigning consecutive addresses to addressable locations in consecutive memory banks in a circular repeating manner.

9. The data processing device of claim 1, wherein the low-level cache memory comprises a plurality of line units, each line unit containing a respective first number of memory banks, each memory bank having addressable locations for storing a second number of data elements, and wherein the low-level cache unit is adapted to store data elements of respective data lines of a data block or of data lines belonging to respective interleaved sets of data lines of a data block, into the memory banks of the respective line units, wherein respective addressable locations of the memory banks each are adapted to store a respective group of data elements consisting of the second number of successive data elements along a data line, such that successive groups of data elements are distributed in circularly repeating fashion over the memory banks of the line unit that stores data elements of the respective data line, to which the groups belong, update the sliding search area by replacing in the memory banks obsolete data elements, which drop out of the sliding search area upon movement of the sliding search area, by new data elements in the search area from a same data line as the obsolete data elements, retrieve and output, in parallel, data elements for respective data lines from a plurality of line units.

10. The data processing device of claim 1, wherein the high-level cache unit comprises a high-level scratchpad.

11. The data processing device of claim 1, further comprising a second pre-fetch buffer, which is connected between the high-level cache memory and the main memory and adapted to provide data to the high-level cache memory in a parallel fashion.

12. The data processing device of claim 11, wherein the high-level cache unit is adapted to pre-fetch from the main memory to the second pre-fetch buffer selected data blocks of the array, which are needed for updating the sliding region according to the predetermined scan order and scan direction, and to update the sliding region in the high-level cache memory with data elements provided at the output of the second pre-fetch buffer.

13. The data processing device of claim 1, wherein the low-level-cache unit is adapted to derive from the read request received from the processing unit window coordinates and a window-size parameter, and to provide data elements stored in the low-level cache unit to the processing unit in dependence on the derived window coordinates and window-size parameter.

14. The data processing device of claim 13, the device being an image processing device, wherein the low-level cache unit is adapted to detect from the window coordinates derived from a read request, whether pixel data is processed by the processing unit with sub-pixel accuracy, and to provide all additional pixels required for sub-pixel-accuracy processing to the processing unit.

15. The processing device of claim 1, wherein either the predetermined scan direction in each block line is from left to right or from right to left or, alternatively, the predetermined scan direction in each block column is from top to bottom or from bottom to top, and wherein the high-level cache unit is adapted to select in the high-level cache memory and provide through the first pre-fetch buffer all data elements of a respective sliding search area for a complete replacement in the low-level cache memory for the purpose of processing a data block at a beginning of a new data block line or data block column of the array, respectively.

16. The processing device of claim 1, wherein the high-level cache unit is adapted to fetch from the main memory, select in the high-level cache memory, and provide through the first pre-fetch buffer all data elements of a respective sliding search area for a complete replacement in the low-level cache memory for the purpose of processing a data block at a beginning of a new main array.

17. A method for controlling operation of a memory unit of a data processing device with a processing unit sequentially processing data blocks, which form two-dimensional sub-arrays of a main array stored in a main memory of the memory unit, and providing read requests to the memory unit for data blocks of a sliding search area extending over a preset number of data-block columns and data-block lines of the main array, the method comprising the steps of fetching from the main memory to a high-level cache memory a sliding region of the main array, the sliding region being larger than the sliding search area, and storing the sliding region in the high-level cache memory fetching from the main memory to the high-level cache memory data blocks for updating the sliding region, and storing the data blocks in the high-level cache memory according to the partition into data lines or data columns, pre-fetching from the high-level cache memory to a first pre-fetch buffer and providing at the output of the first pre-fetch buffer data elements of the sliding region, which are needed to update the search area in a future sliding-search-area movement, deriving a parameter from the read request, storing and updating the sliding search area in a low-level cache memory concurrently with the above fetching and pre-fetching operations, using the data elements provided at the output of the first pre-fetch buffer, selecting and outputting requested data elements using the parameter from the low-level cache memory to the processing unit concurrently with the above fetching and pre-fetching operations.

18. The method of claim 17, comprising a step of providing data elements of the sliding region to the low-level cache memory according to a fixed data format having a preset number of bit positions and assigning a predetermined bit value to all bit positions, which are not used by a format of the main array.

19. The method of claim 17, wherein data is provided from the first pre-fetch buffer to the low-level cache memory in a parallel fashion.

20. The method of claim 17, wherein all data elements of the sliding search area are provided in the low-level cache memory and selected data elements stored in the low-level cache memory are replaced for updating the sliding search area with new data elements according to a first-in-first-out replacement scheme.

21. The method of claim 17, wherein the low-level cache memory comprises a plurality of memory banks and wherein data elements belonging to consecutive data lines of a data block are stored in different memory banks, and wherein a plurality of data lines of a requested data block is output from the low-level cache memory to the processing unit in parallel.

22. The method of claim 21, wherein locations in the low-level cache memory are addressed in an interleaved manner, assigning consecutive addresses to addressable locations in consecutive memory banks in a circular repeating manner.

23. The method of claim 17, comprising a step of pre-fetching from the main memory to a second pre-fetch buffer selected data blocks of the main array, which are needed for updating the sliding region according to the predetermined scan order and scan direction, and of updating the sliding region in the high-level cache memory with data elements provided at the output of the second pre-fetch buffer.

24. The method of claim 17, comprising a step of deriving from the read request received from the processing unit window coordinates and a window-size parameter, and of providing data elements stored in the low-level cache memory to the processing unit in dependence on the derived window coordinates and window-size parameter.

25. The method of claim 17, wherein either the predetermined scan direction in each data-block line is from left to right or from right to left or, alternatively, the predetermined scan direction in each data block column is from top to bottom or from bottom to top, the method comprising the steps of selecting in the high-level cache memory and providing through the first pre-fetch buffer all data elements of a respective sliding search area for a complete replacement in the low-level cache memory for the purpose of processing a data block at a beginning of a new data block line or data block column of the main array, respectively.

26. The method of claim 17, comprising the steps of fetching from the main memory, selecting in the high-level cache memory and providing through the first pre-fetch buffer all data elements of a respective sliding search area for a complete replacement in the low-level cache memory for the purpose of processing a data block at a beginning of a new main array.

* * * * *